US012570477B2

(12) United States Patent
Chen et al.

(10) Patent No.: US 12,570,477 B2
(45) Date of Patent: Mar. 10, 2026

(54) TAPER COVER SEGMENT AND METHOD

(71) Applicant: Intelligrated Headquarters, LLC,
Mason, OH (US)

(72) Inventors: Dongjie Chen, Morrow, OH (US);
Harsha Sanjeewa Bulathsinghalage,
Miamisburg, OH (US); **Kenneth Paul
Cunningham, Jr.,** West Chester, OH
(US); Gregory Matthew Pollitt,
Loveland, OH (US)

(73) Assignee: Intelligrated Headquarters, LLC,
Mason, OH (US)

( * ) Notice: Subject to any disclaimer, the term of this
patent is extended or adjusted under 35
U.S.C. 154(b) by 181 days.

(21) Appl. No.: 18/612,899

(22) Filed: Mar. 21, 2024

(65) Prior Publication Data
US 2025/0296783 A1 Sep. 25, 2025

(51) Int. Cl.
B65G 39/07 (2006.01)
B65G 39/04 (2006.01)
(52) U.S. Cl.
CPC .................................... B65G 39/07 (2013.01)
(58) Field of Classification Search
CPC ................................ B65G 39/04; B65G 39/07
USPC ................................................. 193/35 R, 37
See application file for complete search history.

(56) References Cited

U.S. PATENT DOCUMENTS

| | | | | | |
|---|---|---|---|---|---|
| 4,896,758 | A | * | 1/1990 | Hoszowski | B60B 35/04 |
| | | | | | 492/45 |
| 5,722,531 | A | * | 3/1998 | Zimny | B65G 15/02 |
| | | | | | 198/831 |
| 6,305,529 | B1 | * | 10/2001 | Scottie | B65G 39/09 |
| | | | | | 198/842 |
| 6,523,665 | B2 | * | 2/2003 | Nimmo | B65G 39/07 |
| | | | | | 193/35 R |

(Continued)

FOREIGN PATENT DOCUMENTS

| | | | | |
|---|---|---|---|---|
| CN | 111470284 | A | * | 7/2020 ............. B65G 39/04 |
| CN | 212475056 | U | | 2/2021 |

(Continued)

OTHER PUBLICATIONS

Netimexchina, "Stator, Motor Iron Core, Stator Lamination", retrieved
from the Internet at URL: <https://netimexchina.en.made-in-china.
com/product/WOhtNBkdlJcp/China-Stator-Motor-Iron-Core-Stator-
Lamination.html> on Jun. 21, 2024, 5 pages.

*Primary Examiner* — Douglas A Hess
(74) *Attorney, Agent, or Firm* — Alston & Bird LLP

(57) ABSTRACT
A taper cover segment configured to fit circumferentially
around a straight roller is disclosed. The taper cover segment
comprising a main body having an inner surface and an outer
surface, a plurality of ribs that are monolithic with the main
body and extend radially inward from the inner surface of
the main body. Each rib has a claw shaped edge that is
configured to provide grip between the rib and the straight
roller. A plurality of cavities is defined between adjacent ribs
of the plurality of rib. A locking arrangement is monolithic (Continued)

with a first end of the main body, and is configured to detachably connect the taper cover segment with another taper cover segment to form a taper cover for encasing the straight roller. The taper cover segment defines a longitudinal axis, and a center of mass of the taper cover segment can be offset from the longitudinal axis.

20 Claims, 9 Drawing Sheets

(56)                    References Cited

U.S. PATENT DOCUMENTS

| | | | | |
|---|---|---|---|---|
| 7,114,613 | B2 * | 10/2006 | Brouwer | B65G 47/082 |
| | | | | 198/786 |
| 7,299,909 | B1 * | 11/2007 | Houghton | B65G 39/07 |
| | | | | 193/35 R |
| 9,045,287 | B2 | 6/2015 | Miller et al. | |
| 10,046,574 | B2 * | 8/2018 | Nitta | B41J 11/04 |
| 11,214,445 | B2 * | 1/2022 | Langensiepen | B65G 39/04 |
| 2024/0262634 | A1 * | 8/2024 | Kolay et al. | |

FOREIGN PATENT DOCUMENTS

| | | | | | |
|---|---|---|---|---|---|
| EP | 2990671 | B1 * | 8/2019 | | F16C 33/4632 |
| EP | 4620871 | A1 * | 9/2025 | | B65G 39/07 |
| JP | 2011-037576 | A | 2/2011 | | |
| JP | 2015-030591 | A | 2/2015 | | |
| JP | 6838088 | B2 | 3/2021 | | |

* cited by examiner

TAPER COVER SEGMENT AND METHOD

TECHNOLOGICAL FIELD

Example embodiments of the present disclosure generally relate to conveyor rollers, and more particularly, to a taper cover segment configured to fit circumferentially around a straight roller.

BACKGROUND

A conveyor system is a standard piece of mechanical handling equipment used across various industries to move goods, products, raw materials, and other materials from one location to another within the same area or building. Typically, for transferring the goods in a curved line, curved conveyor sections are utilized. The curved conveyor sections comprise tapered conveyor rollers. The tapered conveyor rollers often include conical frustum members that are positioned over a straight roller. The manufacturing and assembly process of existing tapered conveyor rollers is often time consuming and expensive.

The inventors have identified numerous areas of improvement in the existing technologies and processes, which are the subjects of embodiments described herein. Through applied effort, ingenuity, and innovation, many of these deficiencies, challenges, and problems have been solved by developing solutions that are included in embodiments of the present disclosure, some examples of which are described in detail herein.

BRIEF SUMMARY

The following presents a summary of some example embodiments to provide a basic understanding of some aspects of the present disclosure. This summary is not an extensive overview and is intended to neither identify key or critical elements nor delineate the scope of such elements. It will also be appreciated that the scope of the disclosure encompasses many potential embodiments in addition to those here summarized, some of which will be further described in the detailed description that is presented later.

In various example embodiments, a taper cover segment is disclosed. The taper cover segment is configured to fit circumferentially around a straight roller. The taper cover comprises a main body having an inner surface and an outer surface. Further, the outer surface may define a frustum shape. Further, a plurality of ribs that are monolithic with the main body and extend radially inward from the inner surface of the main body. Each rib has a claw shaped edge that is configured to provide a grip between the rib and the straight roller. Further, a plurality of cavities is defined between adjacent ribs of the plurality of ribs. Further, a locking arrangement that is monolithic with a first end of the main body. Further, the locking arrangement is configured to detachably connect the taper cover segment with another taper cover segment to form a taper cover for encasing the straight roller. In some embodiments, the taper cover segment defines a longitudinal axis, and a center of mass of the taper cover segment is offset from the longitudinal axis.

In some embodiments, the taper cover segment further comprises a weight positioned within one of the plurality of cavities for adjusting the center of mass of the taper cover segment to be offset from the longitudinal axis.

In some embodiments, each of the plurality of ribs defines a thickness. Further, the thickness of one of the plurality of ribs is greater than the thickness of another one of the plurality of ribs by at least two hundred percent.

In some embodiments, the locking arrangement comprises at least one of a latch locking arrangement, an annular snap joint locking arrangement, a bayonet lock arrangement, or a thread locking arrangement. In some embodiments, the locking arrangement comprises the latch locking arrangement that comprises a plurality of latches. Further, the plurality of latches is configured to interlock with another plurality of latches of the another taper cover segment.

In some embodiments, the locking arrangement comprises the annular snap joint locking arrangement that comprises a male connector having a plurality of bumps that is configured to mate with a female connector of the another taper cover segment. The female connector having a plurality of grooves.

In some embodiments, the locking arrangement comprises the bayonet lock arrangement that comprises a male connector having one or more radial pins that is configured to mate with a female connector of the another taper cover segment. Further, the female connector having a matching L-shaped slot.

In some embodiments, the taper cover segment further comprises a second locking arrangement that is monolithic with a second end of the main body, and an end cap that comprises an end cap locking arrangement. Further, the end cap is attached to the main body via the end cap locking arrangement and the second locking arrangement.

In some embodiments, each rib is integrated with a curved joint section that joins each rib with the inner surface of the taper cover segment, for reducing stress concentration between the rib and the main body.

In some embodiments, the taper cover segment comprises a polymer. In some embodiments, the main body of the taper cover segment has a second end. In some embodiments, radius of the main body of the taper cover segment depends on an outer radius of the straight roller and a desired taper rate.

In some embodiments, the locking arrangement between the taper cover segment and the another taper cover segment prevents movement of the tar cover segment relative to the another taper cover segment.

In another example embodiment, a method is disclosed. The method comprises providing a grip between a rib of a plurality of ribs that are monolithic with a main body and extend radially inward from an inner surface of the main body, and a straight roller. A plurality of cavities are defined between adjacent ribs of the plurality of ribs. Thereafter, The method comprises connecting, via a locking arrangement monolithic with a first end of a main body, a taper cover segment with another taper cover segment to form a taper cover for encasing the straight roller. The taper cover segment defines a longitudinal axis, and a center of mass of the taper cover segment is offset from the longitudinal axis.

The above summary is provided merely for purposes of summarizing some example embodiments to provide a basic understanding of some aspects of the present disclosure. Accordingly, it will be appreciated that the above-described embodiments are merely examples and should not be construed to narrow the scope or spirit of the present disclosure in any way. It will be appreciated that the scope of the present disclosure encompasses many potential embodiments in addition to those here summarized, some of which will be further described below.

BRIEF DESCRIPTION OF THE DRA WINGS

Having thus described certain example embodiments of the present disclosure in general terms, reference will here- inafter be made to the accompanying drawings, which are not necessarily drawn to scale, and wherein:

DETAILED DESCRIPTION

Figure 1:
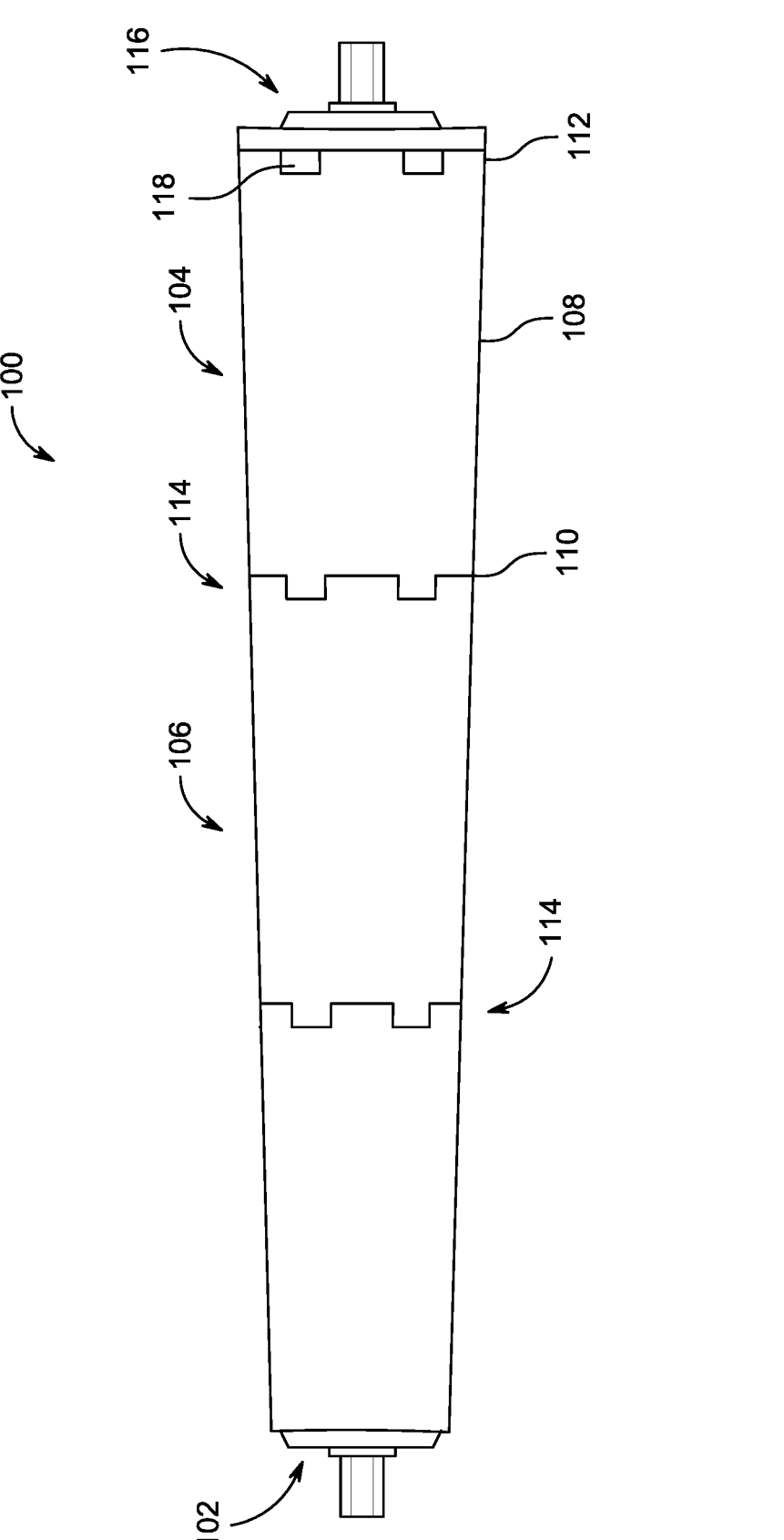
FIG. 1 illustrates a side view of a taper cover encased over a straight roller in accordance with an example embodiment of the present disclosure.

Some embodiments will now be described more fully hereinafter with reference to the accompanying drawings, in which some, but not all, embodiments of the present disclosure are shown. Indeed, various embodiments may be embodied in many different forms and should not be construed as limited to the embodiments set forth herein; rather, these embodiments are provided so that this disclosure will satisfy applicable legal requirements.

The components illustrated in the figures represent components that may or may not be present in various embodiments of the present disclosure described herein such that embodiments may include fewer or more components than those shown in the figures while not departing from the scope of the present disclosure. Some components may be omitted from one or more figures or shown in dashed line for visibility of the underlying components.

As used herein, the term "comprising" means including but not limited to and should be interpreted in the manner it is typically used in the patent context. Use of broader terms such as comprises, includes, and having should be understood to provide support for narrower terms such as consisting of, consisting essentially of, and comprised substantially of.

The phrases "in various embodiments," "in one embodiment," "according to one embodiment," "in some embodiments," and the like generally mean that the particular feature, structure, or characteristic following the phrase may be included in at least one embodiment of the present disclosure and may be included in more than one embodiment of the present disclosure (importantly, such phrases do not necessarily refer to the same embodiment).

The word "example" or "exemplary" is used herein to mean "serving as an example, instance, or illustration." Any implementation described herein as "exemplary" is not necessarily to be construed as preferred or advantageous over other implementations.

If the specification states a component or feature "may," "can," "could," "should," "would," "preferably," "possibly," "typically," "optionally," "for example," "often," or "might" (or other such language) be included or have a characteristic, that a specific component or feature is not required to be included or to have the characteristic. Such a component or feature may be optionally included in some embodiments or it may be excluded.

The present disclosure provides various embodiments of a taper cover segment configured to fit circumferentially around a straight roller. Embodiments may be configured to comprise a main body that may have an inner surface and an outer surface, where the outer surface may define a frustum shape. Embodiments may be configured to comprise a plurality of ribs that may be monolithic to the main body and extend radially inward from the inner surface of the main body. Embodiments may be configured to have a claw shaped edge at each rib for providing a grip between the rib and the straight roller. Embodiments may further comprise a plurality of cavities that may be between adjacent ribs of the plurality of ribs. Embodiments may further comprise a locking arrangement that may be monolithic with a first end of the main body and configured to detachably connect the taper cover segment with another taper cover segment to form a taper cover for encasing the straight roller.

FIG. 1 illustrates a side view of a taper cover 100 encased over a straight roller 102, in accordance with an example embodiment of the present disclosure.

In some embodiments, the taper cover 100 may be configured to fit circumferentially around the straight roller 102. The straight roller 102 may be associated with a conveyor system. In some embodiments, the taper cover 100 may be configured to guide one or more packages smoothly along a conveyor line of the conveyor system. Further, the taper cover 100 may be configured to reduce friction while guiding the one or more packages in the conveyor system. In some embodiments, the taper cover 100 may be configured to be encased over the straight roller 102 and may be tapered at a predefined angle to provide curved path to the one or more packages in the conveyor system. In some embodiments, the taper cover 100 along with other taper covers (not shown) may be placed in series in the conveyor system to form a curved path for guiding the one or more packages.

In some embodiments, the taper cover 100 may comprise a plurality of taper cover segments 104. Further each taper cover segment 104 may be connected to another taper cover segment 106 to form the taper cover 100. In some embodiments, the taper cover segment 104 may be constructed with a list of durable materials such as, but are not limited to, metals, plastic, or alloys. Such durable materials of the taper cover segment 104 may enhance durability and resistance of the taper cover segment 104 from heat or wear and tear. In some embodiments, the taper cover segment 104 may be crafted with a shape that may be selected from a group of shapes such as, but are not limited to, a conical shape, a conical frustum shape, a circular shape, cylindrical shape, or any other shape known in the art. It will be apparent to one skilled in the art that above-mentioned materials and shapes have been provided only for illustration purposes, without departing from the scope of the disclosure.

Figure 2:
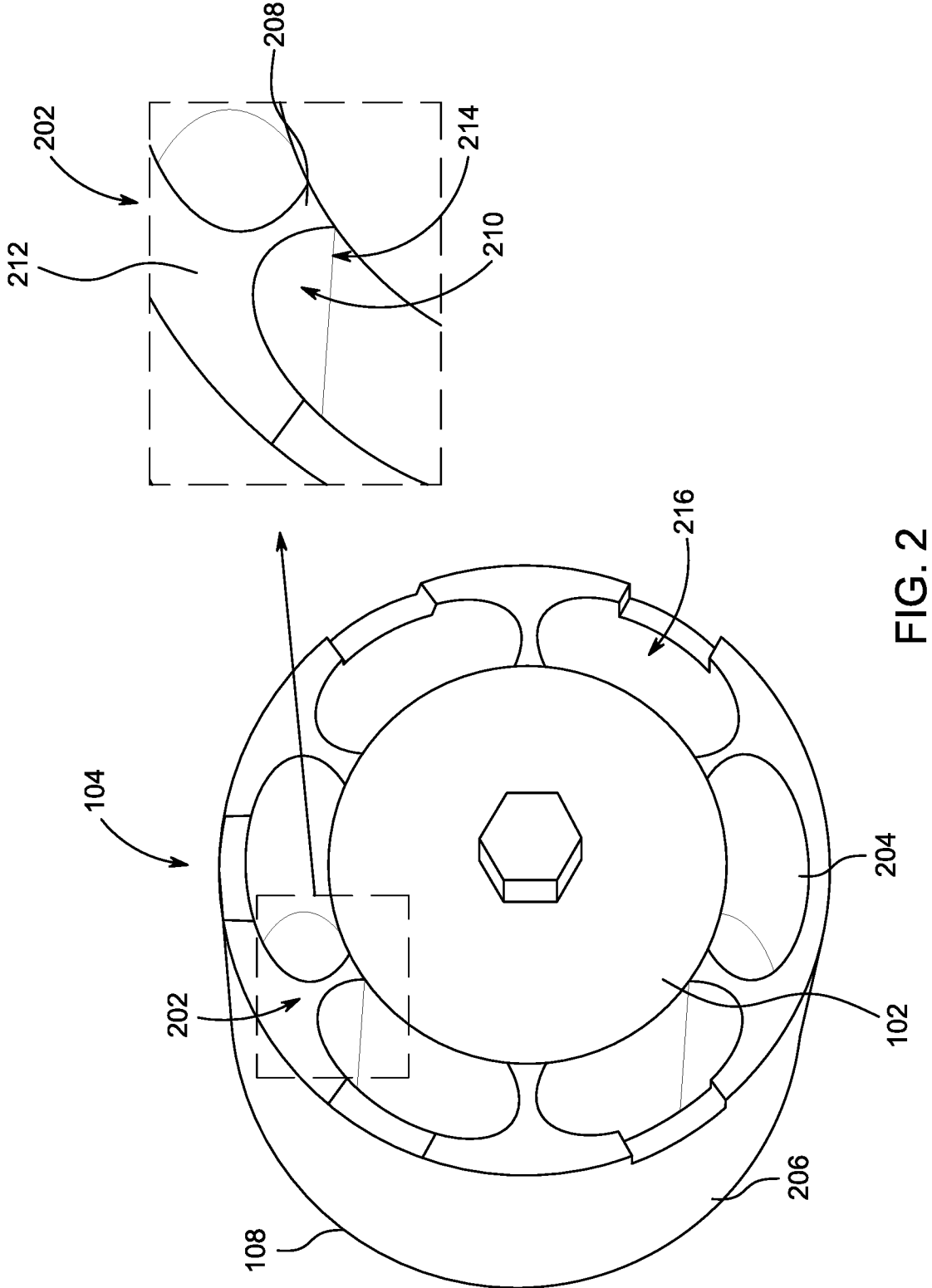
FIG. 2 illustrates a perspective view of a taper cover segment showing a plurality of ribs in accordance with an example embodiment of the present disclosure.

In some embodiments, the taper cover segment 104 may comprise a main body 108 having an inner surface 204 and an outer surface 206 as shown in FIG. 2. Further, the outer surface 206 may have a frustum shape, such as a conical frustum shape. In some embodiments, the main body 108 of the taper cover segment 104 may comprise a first end 110 and a second end 112. In some embodiments, radius of the main body 108 of the taper cover segment 104 may depend on an outer radius of the straight roller 102 and a desired taper rate. In some embodiments, the taper cover segment 104 may be connected detachably via a locking arrangement 114 to the another taper cover segment 106. Further, the locking arrangement 114 may be configured to connect the taper cover segment 104 with another taper cover segment 106 to form the taper cover 100. The locking arrangement 114 between the taper cover segment 104 and the another taper cover segment 106 may prevent movement of the taper cover segment 104 relative to the another taper cover segment 106 during rotational movement.

In some embodiments, the taper cover segment 104 may further comprise a second locking arrangement 502 that is monolithic with the second end 112 of the main body 108. The second locking arrangement 502 may be configured to detachably attach an end cap 116 with the main body 108 of the taper cover segment 104. Further, the end cap 116 may comprise an end cap locking arrangement 118. Further, the end cap 116 may be attached to the main body 108 via the end cap locking arrangement 118 and the second locking arrangement 502. Further, the end cap 116 may be configured to encase the straight roller 102 with the taper cover segment 104. In some embodiments, the end cap 116 may be configured to prevent sliding of the taper cover 100 from the straight roller 102.

FIG. 2 illustrates a perspective view of the taper cover segment 104 showing a plurality of ribs 202, in accordance with an example embodiment of the present disclosure.

In some embodiments, the taper cover segment 104 may further comprise the plurality of ribs 202 that are monolithic with the main body 108 of the taper cover segment 104. In some embodiments, the main body 108 may have the inner surface 204 and the outer surface 206. In some embodiments, the plurality of ribs 202 may be monolithic with the inner surface 204 of the main body 108. Further, the plurality of ribs 202 may be configured to extend radially inward from the inner surface 204 of the main body 108. In exemplary embodiments, the main body 108 of the taper cover segment 104 may have a cylindrical portion.

Further, each rib 202 may have a claw shaped edge 208. In some embodiments, the claw shaped edge 208 may be configured to provide grip between each rib 202 and the straight roller 102. In some embodiments, each of the plurality of ribs 202 may have a thickness that may vary relative to height of each rib 202. The thickness of each rib may be minimum at a middle portion 210 of each rib 202. Further, the thickness of each rib 202 may increase gradually towards a first end 212 and a second end 214 of each rib 202. In some embodiments, the first end 212 of each rib 202 may be monolithic with the inner surface 204 of the main body 108. Further, the second end 214 of each rib 202 may be placed over the straight roller 102 and may comprise the claw shaped edge 208.

In some embodiments, the claw shaped edge 208 may be configured to provide large surface area to increase grip between each rib of the plurality of ribs 202 and the straight roller 102. In some embodiments, the claw shaped edge 208 may be configured to reduce stress concentration of the outer surface 206 of the main body 108 of the taper cover segment 104 while transferring the one or more packages from one location of another. In some embodiments, the outer surface 206 of the main body 108 may be configured to experience the weight of the one or more packages that are transferred that may result to a compressive force. Further, the compressive force that may be experienced by the outer surface 206 of the main body 108 may further be transmitted to the plurality of ribs 202. Further, the plurality of ribs 202 may be configured to transmit the compressive force to the claw shaped edge 208 for distributing the weight of the packages throughout the main body 108 of the taper cover segment 104.

In some embodiments, the plurality of cavities 216 may be formed between adjacent ribs 202 of the plurality of ribs 202. In some embodiments, the plurality of cavities 216 may be configured to allow the claw shaped edge 208 to extend inward for providing secure grip of the claw shaped edge 208 on the straight roller 102. In some embodiments, each of the plurality of ribs 202 may define a thickness. Further, the thickness of one of the plurality of ribs 202 may be greater than the thickness of another one of the plurality of ribs 202 by at least two hundred percent. For example, in the example of FIG. 3A, rib 300 has a greater thickness than other ribs of the plurality of ribs 202.

Figure 3A:
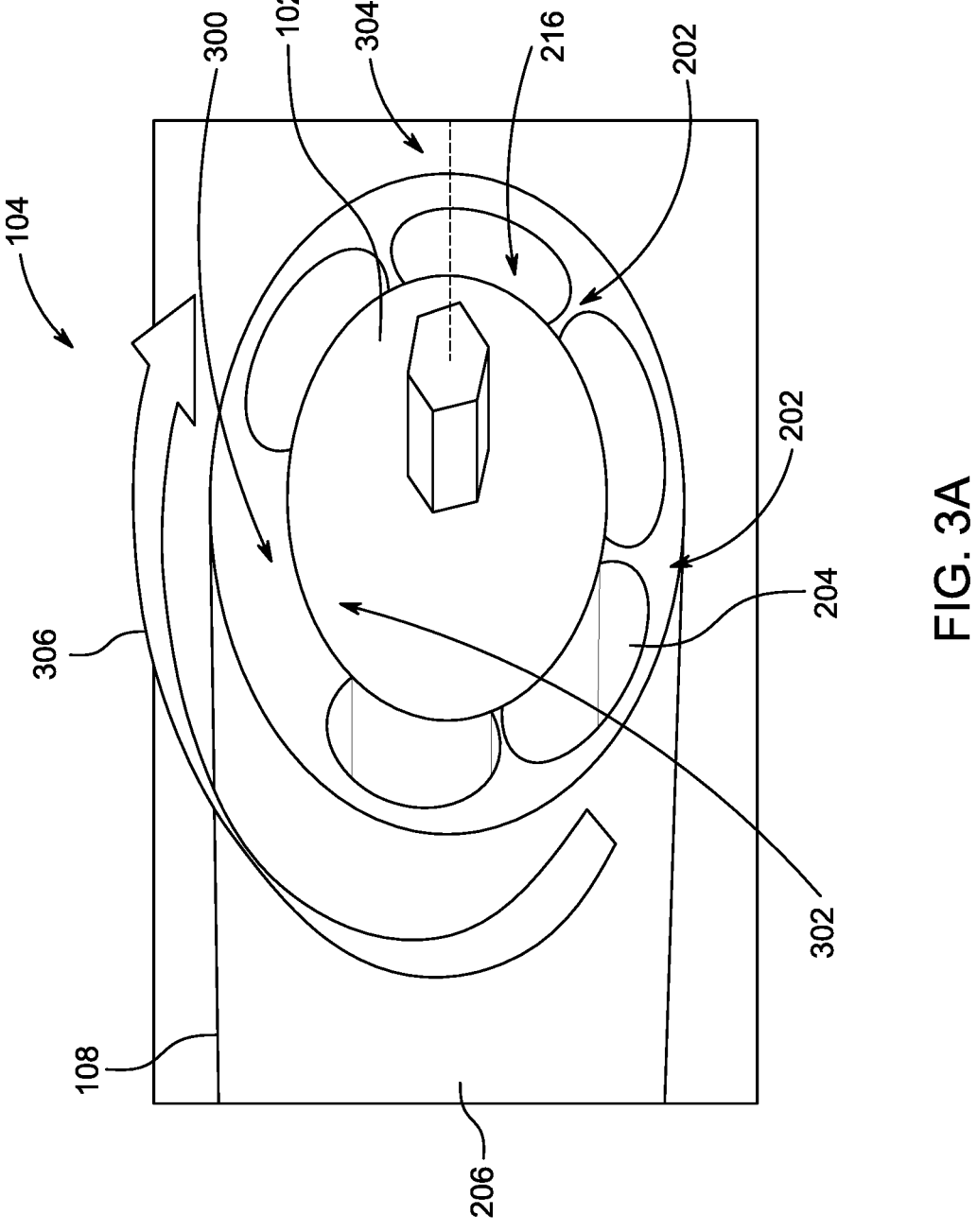
FIG. 3A illustrates a perspective view of a taper cover segment in accordance with an example embodiment of the present disclosure.

FIG. 3A illustrates a perspective view of a taper cover segment 104 that has an offset center of mass (COM) relative to a longitudinal axis 304 of the taper cover segment 104, in accordance with an example embodiment of the present disclosure.

In some embodiments, the offsetting of the COM of the taper cover segment 104 may be accomplished by the process of injection molding. In some embodiments, the taper cover segment 104 is manufactured by injection molding and a plurality of pins (not shown) can be inserted into the mold to form each of the cavities 216. In some embodiments, during the process of injection molding, the mold (not shown) may be modified by removing at least one of the pins. Further, the removal of the at least one pin during the injection molding process may prevent the formation of the one of the plurality of cavities 216, as shown by an arrow 302, which may result in a rib 300 that has a greater thickness than the other ribs of the plurality of ribs 202.

In some embodiments, the taper cover segment 104 may define the longitudinal axis 304. Further, the longitudinal axis 304 may be configured to run lengthwise through the taper cover segment 104. In some embodiments the COM of the taper cover segment 104 may be configured to be offset from the longitudinal axis 304 due to the addition of weight within one of the plurality of cavities 216 and/or removal of at least one of the pins during the injection molding process. Further, the offset of the COM from the taper cover segment 104 may be configured to provide unbalanced weight distribution at the circumferential direction of the taper cover segment 104.

In some embodiments, the unbalanced weight distribution of the taper cover segment 104 may facilitate to retard an ideal rotational movement as shown by an arrow 306. In some embodiments, when the taper cover segment 104 is unbalanced, it causes uneven distribution of weight around the longitudinal axis 304 of the taper cover segment 104. Such imbalance or uneven distribution of the weight may lead to vibration and wobbling (in a small degree) as the taper cover segment 104 spins. As the taper cover segment 104 rotates, the uneven distribution of weight creates centrifugal forces that result in the taper cover segment 104 vibrating and wobbling. Such vibration and wobbling may lead to slowing down the speed of the taper cover segment 104.

Figure 3B:
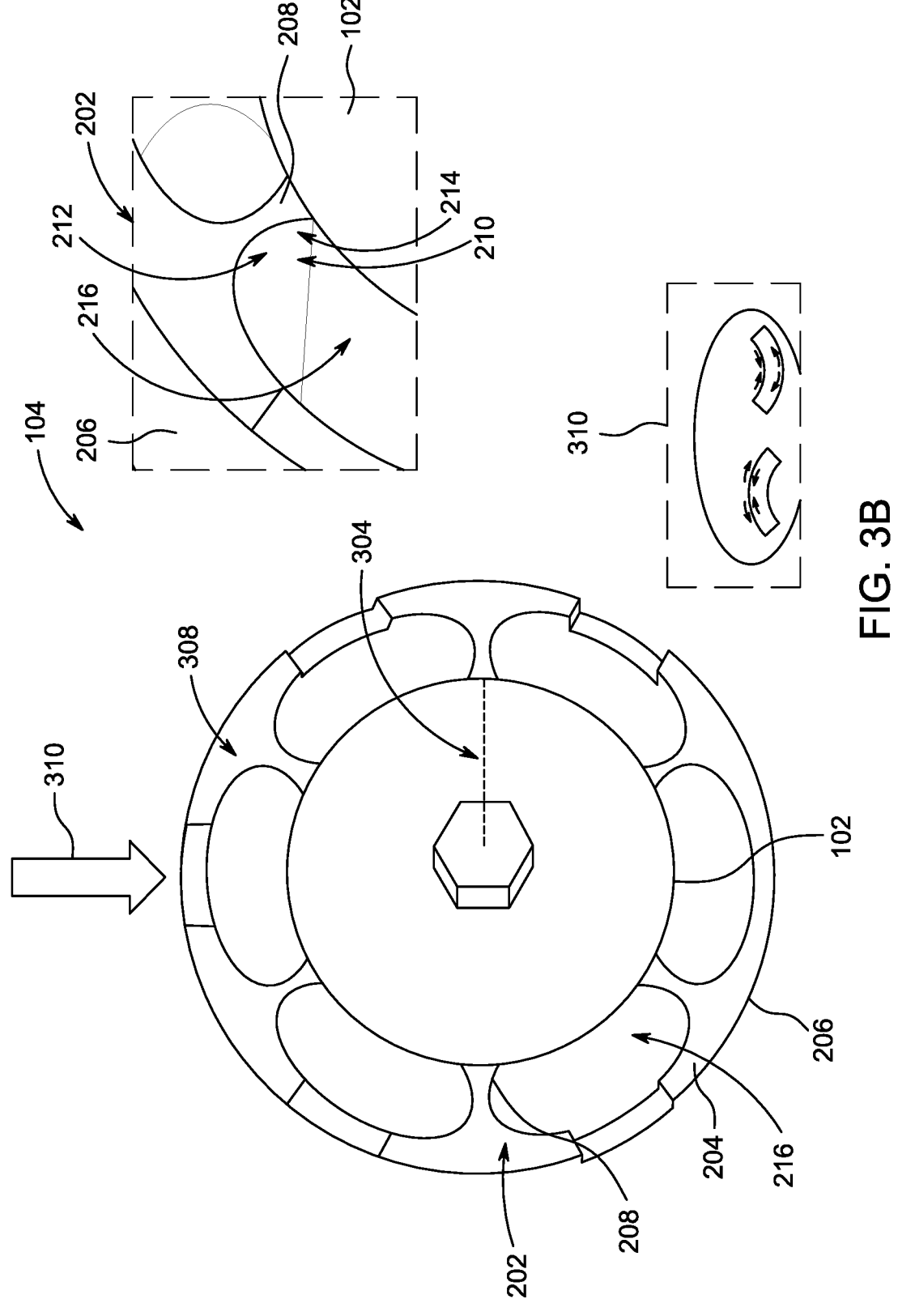
FIG. 3B illustrates a side view of the taper cover segment in accordance with an example embodiment of the present disclosure.

FIG. 3B illustrates a side view of the taper cover segment 104 showing smooth transition between each rib 202 and the main body 108 of the taper cover segment 104, in accordance with an example embodiment of the present disclosure.

In some embodiments, the plurality of ribs 202 and the main body 108 may form a smooth transition surface 308 to reduce stress concentration applied over each rib 202. In some embodiments, the outer surface 206 of the main body 108 may be configured to carry the weight of the one or more packages that are transferred from one place to another over the conveyor assembly. Further, a compressive force or tensile stress as shown by an arrow 310 exerted by the weight of the one or more packages may be transmitted to the inner surface 204 of the main body 108. Further, the plurality of ribs 202 that may be configured to extend radially inward from the inner surface 204 of the main body 108 may undergo into the compressive stress or the tensile stress.

In some embodiments, the plurality of ribs 202 may be configured to attach perpendicular to the inner surface 204 of the main body 108. In some embodiments, the smooth transition surface 308 between the main body 108 and each rib 202 may be configured to distribute the compressive force of the package circumferentially around the inner surface 204 of the main body 108. In some embodiments, the weight of the one or more packages may be distributed throughout the plurality of ribs 202. Further, the plurality of ribs 202 may be configured to distribute the weight of the packages to reduce the stress concentration of the taper cover segment 104.

In some embodiments, the plurality of ribs 202 may be configured to transfer the compressive force to the claw shaped edge 208. Further, the claw shaped edge 208 may be configured to increase the surface area for increasing the grip of the claw shaped edge 208 on the straight roller 102. The straight roller 102 may be configured to rotate relative to the axis of axle for transferring the packages without any damage of the taper cover segment 104.

FIGS. 4A-4D illustrate side views of taper cover segments 104 showing the plurality of cavities 216 having at least one weight 402 within them in different combinations, in accordance with various example embodiments of the present disclosure.

In some embodiments, some of the plurality of cavities 216 may have at least one weight 402 positioned within to provide unbalanced weight distribution at the circumferential direction of the taper cover segment 104. In some embodiments, the weight 402 may be included by using the injection molding process as described in FIG. 3A or may be included by adding at least one weight 402 inside at least one of the plurality of cavities 216. In some embodiments, the weight 402 may correspond to an adhesive polymer, a steel weight, or a combination of both thereof. In an example embodiment, at least one of the plurality of cavities 216 may include a weight 402 that is affixed on the inner surface 204 of the main body 108 of the taper cover segment 104.

In some embodiments, the weight 402 may be configured to distribute a mass of the taper cover segment 104 unevenly as illustrated in combination 404. In some embodiments, the uneven mass distribution of the taper cover segment 104 may be configured to provide unbalanced weight distribution in the circumferential direction of the taper cover segment 104. Further, the COM may be configured to be offset from the longitudinal axis. Further, the unbalanced weight distribution in the circumferential direction may cause unbalanced rotation of the taper cover segment 104 as illustrated by arrow 306 (FIG. 3A). In some embodiments, the unbalanced rotation may de-accelerate the rotation of the straight roller 102.

In some embodiments, the insertion of weight 402 within the taper cover segment 104 in the combination 404 may form a deceleration zone 406. In some embodiments, the deceleration zone 406 may cover radius of the taper cover segment 104 from a range of 120 to 140 degrees. The deceleration zone 406 may be defined as the zone where maximum deceleration effect is experienced by the taper cover segment 104 due to the weight 402. Further, a load zone 408 may be formed. The load zone 408 may be defined as the zone where maximum load is experienced by the taper cover segment 104 due to the weight of the one or more packages over the taper cover 100. In some embodiments, in the load zone 408, the taper cover segment 104 may rotate in normal speed and in the deceleration zone 406 the taper cover segment 104 may rotate in reduced speed.

In some embodiments, between the deceleration zone 406 and the load zone 408, an acceleration zone 410 may exist. The acceleration zone 410 may be defined as the zone where the reduced speed due of the taper cover segment 104 due to the deceleration zone 406 may come back to the normalized speed due to the load zone 408. In some embodiments, the deceleration zone 406, the load zone 408, and the acceleration zone 410 may be created due to the centrifugal force experienced by the taper cover segment 104. The centrifugal force may change due to the irregular weight distribution within the taper cover segment 104.

Figure 4A:
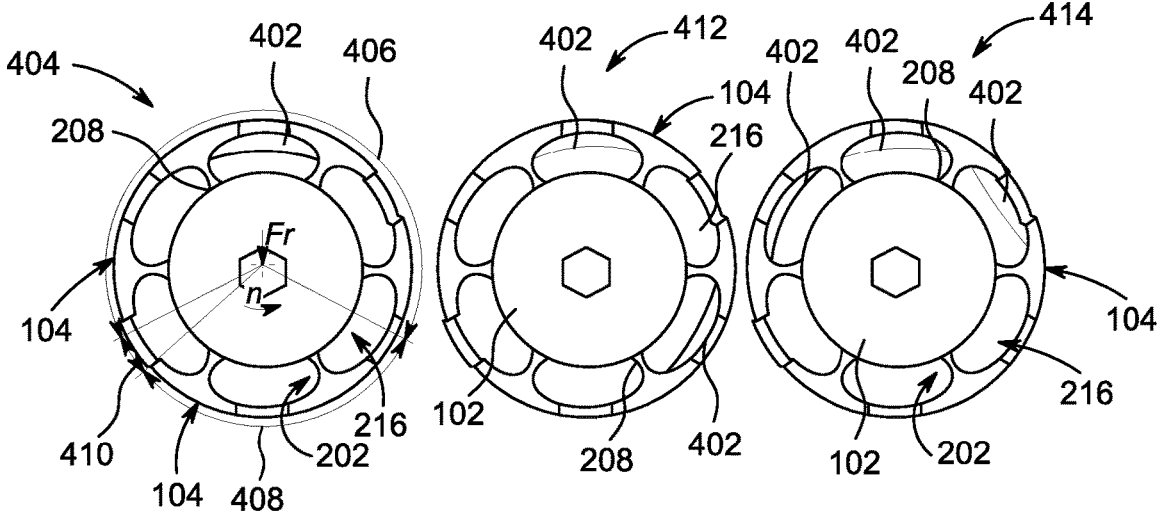
FIGS. 4A-4D illustrate side views of taper cover segments in accordance with various example embodiments of the present disclosure.

In at least one example embodiment, different cavities of the plurality of cavities 216 may include the weight 402, which may be affixed on the inner surface 204 of the main body 108 as illustrated in different combinations 412, 414 as shown in FIG. 4A. In at least one embodiment, in combination 412, at least two cavities from the plurality of cavities 216 may have the weight 402. Further, in combination 414, at least three cavities of the plurality of cavities 216 may have weight 402. In some embodiment, different cavities of the plurality of cavities 216 may be filled with the weight 402 that may be affixed on the inner surface 204 of the main body 108 as illustrated in different combinations 416, 418, and 420 as shown in FIG. 4B.

Figure 4B:
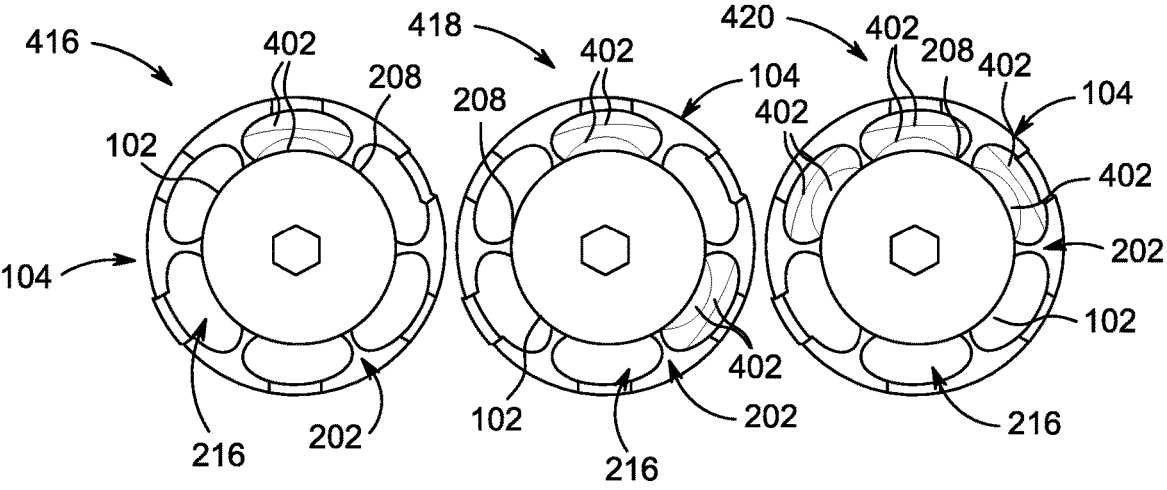
Figure 4C:
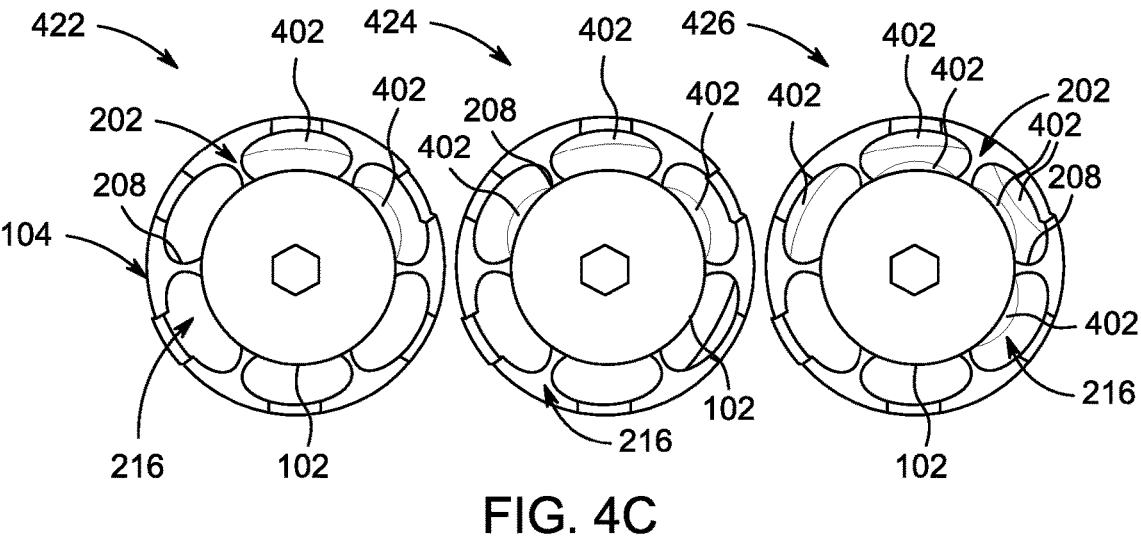

In at least one embodiment, in combination 416, at least one cavity from the plurality of cavities 216 may have weight 402 made up of an adhesive polymer and a steel weight as shown in FIG. 4B. Further, in combination 418, at least two cavities from the plurality of cavities 216 may have a weight 402 made up of adhesive polymer and a steel weight. Further, in combination 420, at least three cavities from the plurality of cavities 216 may have a weight 402 made up of adhesive polymer and a steel weight. In some embodiment, different cavities of the plurality of cavities 216 may be filled with the weight 402 that may be affixed on the inner surface 204 of the main body 108 as illustrated in different combinations 422, 424 and 426 as shown in FIG. 4C. In various examples, at least one weight 402 may be affixed to the straight roller 102.

In at least one embodiment, in combination 422, at least one cavity from the plurality of cavities 216 may have weight 402 made up of adhesive polymer and other adjacent cavity from the plurality of cavities 216 may have weight 402 made up of steel weight. In at least one embodiment, in combination 424, at least one cavity from the plurality of cavities 216 may have weight 402 made up of adhesive polymer and at least two adjacent cavities from the plurality of cavities 216 may have weight 402 made up of steel weight. In some embodiment, in combination 426, at least three cavities from the plurality of cavities 216 may have weight 402 made up of adhesive polymer and other three cavities from the plurality of cavities 216 may have weight 402 made up of steel weight such that at least two cavities may have weight 402 of both polymer and steel weight.

Figure 4D:
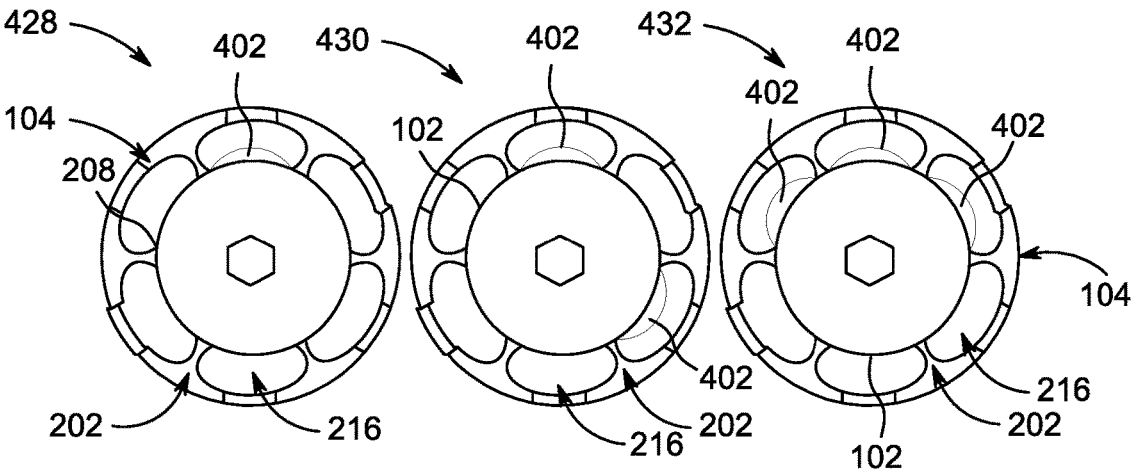

In some embodiment, different cavities of the plurality of cavities 216 may be filled with the weight 402 that may be affixed on the inner surface 204 of the main body 108 as illustrated in different combinations 428, 430, and 432 as shown in FIG. 4D. In at least one embodiment, in combination 428, at least one cavity from the plurality of cavities 216 may have weight 402 made up of steel weight. In at least one embodiment, in combination 430, at least two alternative cavities from the plurality of cavities 216 may have weight 402 made up of steel weight. In at least one embodiment, in combination 432, at least three adjacent cavities from the plurality of cavities 216 may have weight 402 made up of steel weight.

In some embodiments, the weight 402 may be configured to distribute mass of the taper cover segment 104 unevenly. Further, the weight 402 may be configured to affix on the inner surface 204 of the main body 108. In some embodiments, the weights 402 may be configured to exert uneven force on the taper cover segment 104. Further, the uneven weight distribution may be configured to provide unbalanced rotation of the taper cover segment 104. In some embodiments, the unbalanced rotation of the taper cover segment 104 may be configured to de-accelerate the rotation of the straight roller 102. In some embodiments, each of the combinations 404-430 may have a deceleration effect onto the rotation of the straight roller 102.

Figure 5:
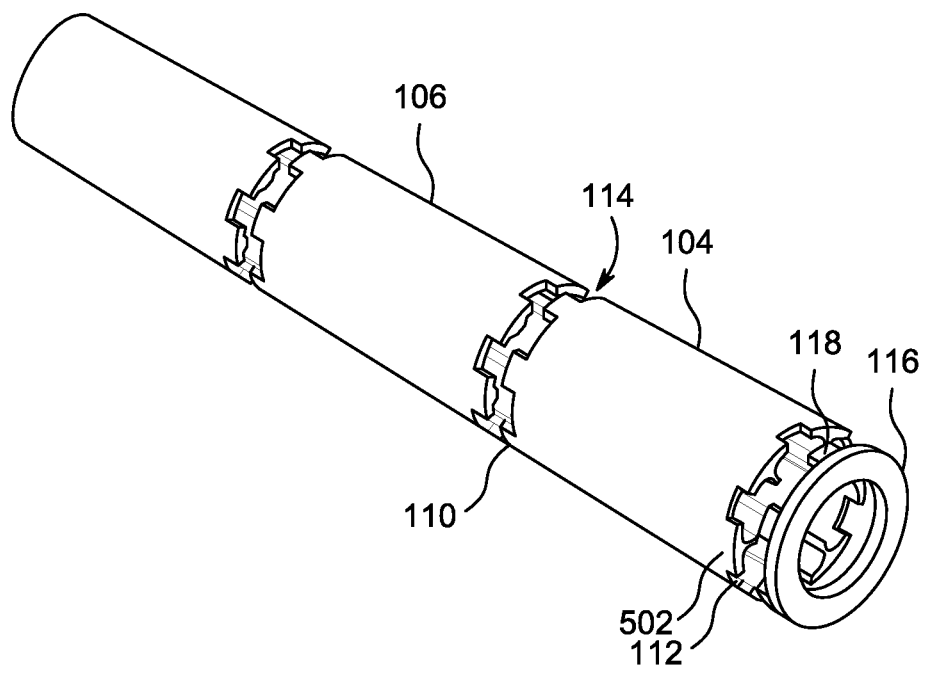
FIG. 5 illustrates an exploded view of the taper cover in accordance with an example embodiment of the present disclosure.

FIG. 5 illustrates an exploded view of the taper cover 100 of FIG. 1 showing the taper cover segment 104 detachably connected to the another taper cover segment 106 and the end cap 116 detachably connected to the taper cover segment 104 via the locking arrangement 114 and a second locking arrangement 502 respectively, in accordance with an example embodiment of the present disclosure.

In some embodiments, the locking arrangement 114 may be monolithic with the first end 110 of the main body 108. Further, the locking arrangement 114 may be configured to detachably connect the taper cover segment 104 with the another taper cover segment 106 to form the taper cover 100. In some embodiments, the taper cover 100 may be configured to encase the straight roller 102. Further, the locking arrangement 114 may be configured to lock the taper cover segment 104 to the another taper cover segment 106. Further, the locking of the taper cover segment 104 may be configured to prevent the movement of the taper cover segment 104 relative to the another taper cover segment 104. In some embodiments, the taper cover segment 104 may be detachably connected to the another taper cover segment 104 via, the latch locking arrangement.

In some embodiments, the end cap 116 may comprise an end cap locking arrangement 118. Further, the second end 112 of the main body 108 may comprise the second locking arrangement 502. Further, the second locking arrangement 502 may be configured to be monolithic with the second end 112 of the main body 108 of the taper cover segment 104. Further, the second locking arrangement 502 may be configured to interlock with the end cap locking arrangement 118 to attach the end cap 116 with the main body 108 of the taper cover segment 104. In some embodiments, the locking arrangement 114 may comprise at least one of a latch locking arrangement, an annular snap joint locking arrangement, a bayonet lock arrangement, or a thread locking arrangement.

In at least one example embodiment, the end cap locking arrangement 118 may comprise at least one of an end cap latch locking arrangement, an end annular snap joint locking arrangement, an end cap bayonet lock arrangement, or an end cap thread locking arrangement. Further, the second end of the main body 108 may comprise compatible second locking arrangement. In some embodiments, the compatible end cap locking arrangement may be configured to lock with the compatible second locking arrangement of the second end for preventing the movement of the taper cover segment 104 relative to the axle.

Figure 6A:
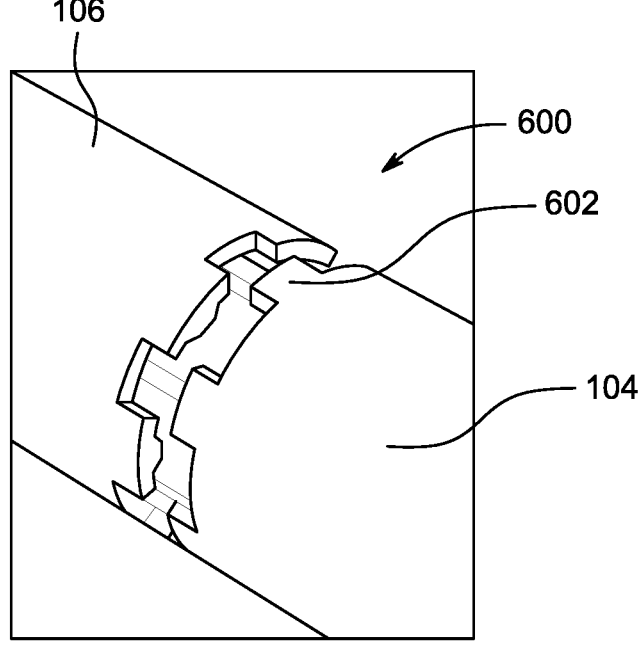
FIG. 6A illustrates a magnified view of the taper cover segment of FIG. 5 in accordance with an example embodiment of the present disclosure.

FIG. 6A illustrates a perspective view of a taper cover segment 104 of FIG. 5 detachably connected to another taper cover segment 106 via a latch locking arrangement 600, in accordance with an example embodiment of the present disclosure.

In some embodiments, the latch locking arrangement 600 may be configured to detachably connect the taper cover segment 104 with the another taper cover segment 106 to form the taper cover 100 for encasing the straight roller 102. In some embodiments, the latch locking arrangement 600 may comprise a plurality of latches 602. In some embodiments, the plurality of latches 602 is monolithic to the taper cover segment 104 and may be configured to interlock with the another plurality of latches 602 of the another taper cover segment 106.

In some embodiments, the plurality of latches 602 of the taper cover segment 104 may be configured to snap fit with the plurality of latches 602 of the another taper cover segment 106 to create a secure and reliable joint between the two adjacent taper cover segments. In some embodiments, the latch locking arrangement 600 between the taper cover segment 104 and the another taper cover segment 106 may configured to prevent relative motion between the detachably connected two adjacent taper cover segments 104.

Figure 6B:
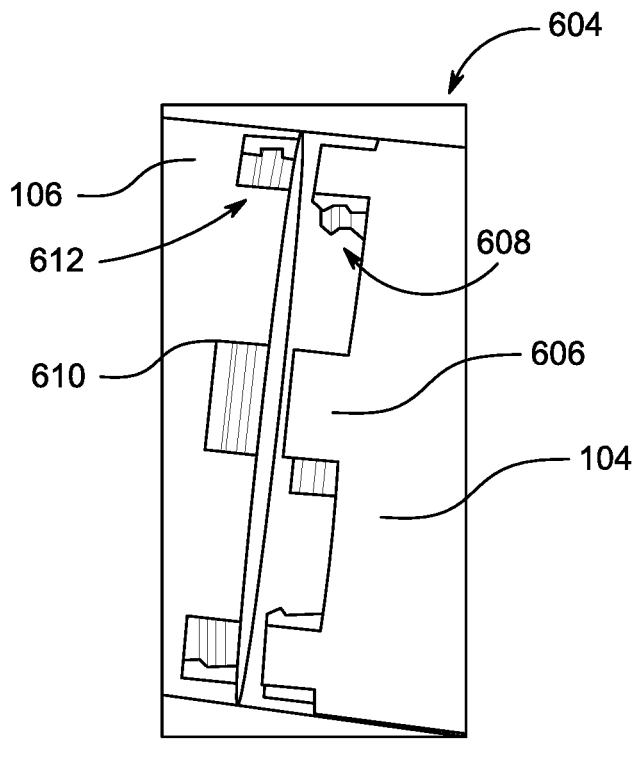
FIG. 6B illustrates a magnified view of a taper cover segment in accordance with an example embodiment of the present disclosure.

FIG. 6B illustrates a perspective view of a taper cover segment 104 detachably connected to another taper cover segment 106 via an annular snap joint arrangement 604, in accordance with an example embodiment of the present disclosure.

In some embodiments, the annular snap joint locking arrangement 604 may comprises a male connector 606. Further, the male connecter 606 may comprise a plurality of bumps 608. In some embodiments, the annular snap joint locking arrangement 604 may further comprise a female connecter 610. Further, the female connector 610 may comprise a plurality of grooves 612. In some embodiments, the plurality of bumps 608 of the male connector 606 may be configured to snap fit with the plurality of grooves 612 of the female connector 610 to interlock the one taper cover segment 104 to the another taper cover segment 106 to form the taper cover 100 for encasing the straight roller 102. In some embodiments, the plurality of bumps 608 may be configured to interlock with the plurality of grooves 612 to create the secure connection between the taper cover segment 104 and the another taper cover segment 106.

Figure 6C:
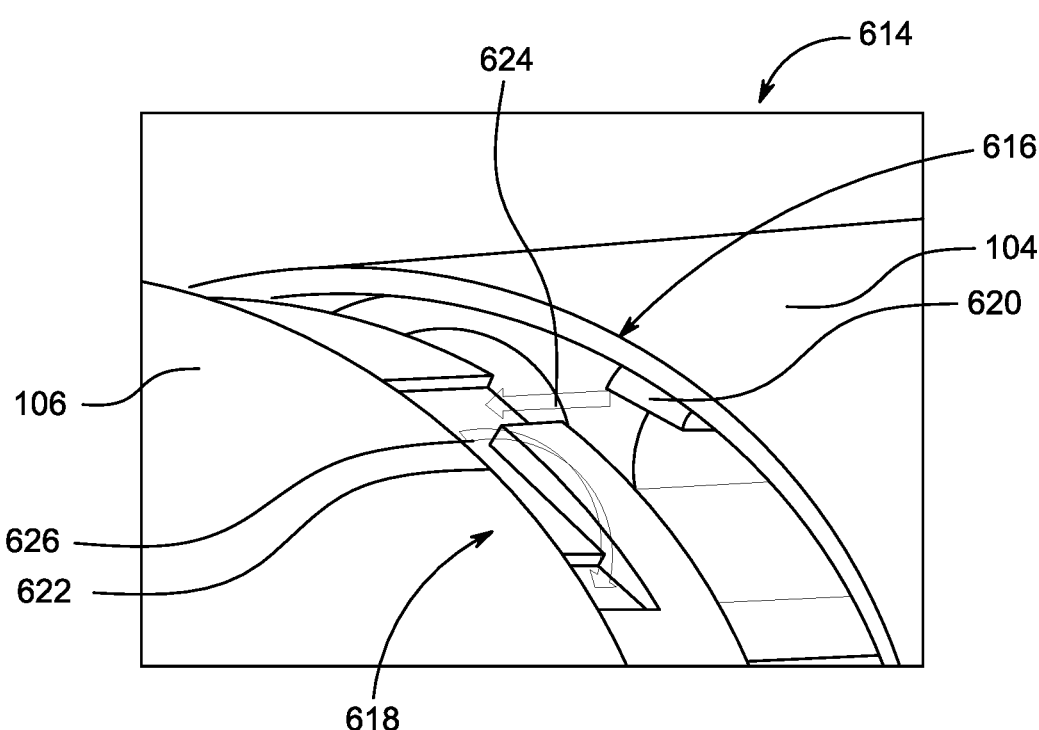
FIG. 6C illustrates a magnified view of a taper cover segment in accordance with an example embodiment of the present disclosure.

FIG. 6C illustrates a perspective view of a taper cover segment 104 detachably connected to another taper cover segment 106 via a bayonet lock arrangement 614, in accordance with an example embodiment of the present disclosure.

In some embodiments, the bayonet lock arrangement 614 may comprise a male connecter 616 and a female connector 618. Further, the male connector 616 may comprise one or more radial pins 620. In some embodiments, the female connector 618 may comprise a matching L-shaped slot 622. In some embodiments, the L-shaped slot 622 may be crafted with a shape that may be selected from a group of shapes such as, but not limited to a L-shape or any other shape known in the art. In some embodiments, the one or more radial pins of the male connector 616 may be configured to snap with in the matching L-shaped slot 622 as shown by an arrow 624. Further, the one of more radial pins 620 may be configured to rotate along the rotation of the taper cover segment 104 as shown by an arrow 626, to interlock the one or more radial pins 620 inside a respective L-shaped slot 622. In some embodiments, the rotational movement of the one or more radials pins 620 may be configured to interlock the taper cover segment 104 to the another taper cover segment 106.

Figure 6D:
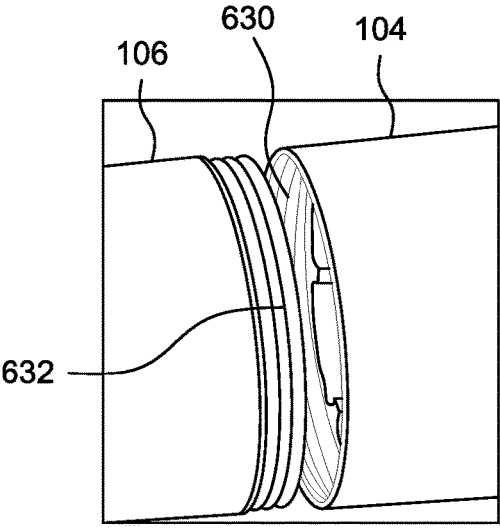
FIG. 6D illustrates a magnified view of a taper cover segment in accordance with an example embodiment of the present disclosure.

FIG. 6D illustrates a perspective view of a taper cover segment 104 detachably connected to another taper cover segment 106 via a thread lock arrangement 628, in accordance with an example embodiment of the present disclosure.

In some embodiments, the inner surface 204 of the main body 108 of the taper cover segment 104 may be fabricated with a plurality of threads 630. Further, the outer surface 206 of the main body 108 of the another taper cover segment 106 may be fabricated with another plurality of threads 632. In some embodiments, the plurality of threads 630 may have helical ridges that slide over helical grooves fabricated with the another plurality of threads 632. The sliding movement of the plurality of threads 630 of the taper cover segment 104 over the another plurality of threads 632 of the another taper cover segment 106, draws the taper cover segment 104 towards the another taper cover segment 106 to get interlocked.

In some embodiment, the taper cover segment 104 may be configured to turn in clockwise direction, causing the plurality of threads 630 to engage with the another plurality of threads 632. In some embodiments, the interlocking of the plurality of threads 630 with the another plurality of threads 632 applied a clamping force between the taper cover segment 104 and the another taper cover segment 106. The amount of clamping force between the taper cover segment 104 and the another taper cover segment 106 may depend at least on pitch of the plurality of threads 630, 632, torque applied during tightening, and material properties of the plurality of threads 630, 632. In some embodiment, the locking mechanism may be configured to prevent the taper cover segments 104 to move away from each other towards the direction of the axle. Further, the locking arrangement may be configured to prevent the relative rotation among the taper cover segments 104.

Figure 7:
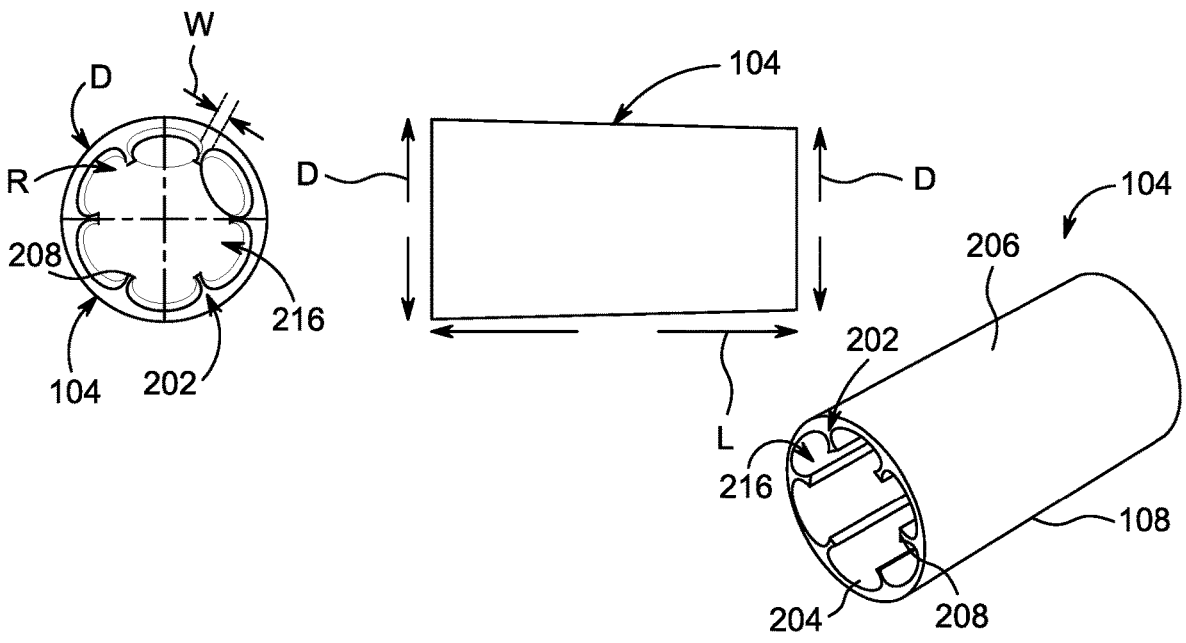
FIG. 7 illustrates a schematic representation of dimensions of a taper cover segment in accordance with an example embodiment of the present disclosure.

FIG. 7 illustrates a schematic representation of measurements of a taper cover segment 104, in accordance with an example embodiment of the present disclosure.

In some embodiments, the taper cover segment 104 may be configured to define a cylindrical portion. In some embodiment, the cylindrical portion may define a diameter D. In example embodiment, the straight line may pass through a center of the taper cover segment 104 may define a diameter D. In some embodiments, the diameter of the taper cover segment 104 may be in the range of 2.880-2.900 mm. In some embodiments, the length of the taper cover segment 104 may define a length L. In some embodiments, the length of the taper cover segment 104 may be in the range of 5.240-5.260 mm. In some embodiments, the straight roller 102 may define a radius of curvature R. In some embodiments, the radius of curvature may be 0.203

MIN. In some embodiments, the distance between the two adjacent ribs of the plurality of ribs 202 may define a width W. In some embodiments, the distance between the two adjacent ribs of the plurality of ribs 202 may be 0.061 MIN.

In an example embodiment, a method is disclosed. At first, connecting the taper cover 100 via the locking arrangement 114 monolithic with the first end 110 of the main body 108, the taper cover segment 104 with another taper cover segment 106 to form the taper cover 100. In some embodiments, the main body 108 comprises the plurality of ribs 202 that are monolithic with the main body 108 and extend radially inward from the inner surface 204 of the main body 108. Further, mounting the taper cover 100 over the straight roller 102.

In some embodiments, the taper cover segment 104 may be configured to fit circumferentially around the straight roller 102. Further, the taper cover segment 104 may comprise the main body 108 having the inner surface 204 and the outer surface 206. In some embodiments, the outer surface 206 of the main body 108 may be configured to experience the compressive force of the packages that are transferred by the conveyor assembly. Further, the compressive force exerted by the packages may be configured to transfer towards the plurality of ribs 202 that are extend radially inward from the inner surface 204 of the main body 108. In some embodiments, each of the rib of the plurality of ribs 202 may comprise the claw shaped edge 208. Further, the claw shaped edge 208 may be configured to provide the grip between the rib 202 and the straight roller 102 to reduce the stress concentration.

Further, the locking arrangement 114 may be configured to monolithic to the first end of the main body 108. In some embodiments, the one of the taper cover segment 104 may be configured to connect detachably to the another taper cover segment 106, via the locking arrangement 114 to the taper cover 100. Further, the locking arrangement 114 may comprise the at least one of the latch locking arrangement, the annular snap joint locking arrangement, the bayonet lock arrangement, or the thread locking arrangement. In some embodiments, the taper cover 100 may be configured to encase the straight roller 102.

The present disclosure involves the taper cover segment 104 that is configured to fit circumferentially around a straight roller. The locking arrangement 114 may be configured to provide the stable positioning of the taper cover 100 on the straight roller 102. The plurality of ribs 202 having the claw shaped edge 208 may be configured to reduce the stress concentration on the taper cover 100. The weights may be configured to provide the unbalanced weight distribution of the taper cover 100 to de-accelerate the rotational movement of the straight roller 102.

Many modifications and other embodiments of the disclosure set forth herein will come to mind to one skilled in the art to which the present disclosure pertains having the benefit of the teachings presented in the foregoing descriptions and the associated drawings. Therefore, it is to be understood that the present disclosure is not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed is:

1. A taper cover segment configured to fit circumferentially around a straight roller, the taper cover segment comprising:

a main body having an inner surface and an outer surface, the outer surface defining a frustum shape;

a plurality of ribs that are monolithic with the main body and extend radially inward from the inner surface of the main body, wherein each rib has a claw shaped edge that is configured to provide a grip between the rib and the straight roller, and wherein a plurality of cavities is defined between adjacent ribs of the plurality of ribs; and a locking arrangement that is monolithic with a first end of the main body, wherein the locking arrangement is configured to detachably connect the taper cover segment with another taper cover segment to form a taper cover for encasing the straight roller, wherein the taper cover segment defines a longitudinal axis, and wherein a center of mass of the taper cover segment is offset from the longitudinal axis.

2. The taper cover segment of claim 1 further comprising a weight positioned within one of the plurality of cavities for adjusting the center of mass of the taper cover segment to be offset from the longitudinal axis.

3. The taper cover segment of claim 1, wherein each of the plurality of ribs defines a thickness, wherein the thickness of one of the plurality of ribs is greater than the thickness of another one of the plurality of ribs by at least two hundred percent.

4. The taper cover segment of claim 1, wherein the locking arrangement comprises at least one of a latch locking arrangement, an annular snap joint locking arrangement, a bayonet lock arrangement, or a thread locking arrangement.

5. The taper cover segment of claim 4, wherein the locking arrangement comprises the latch locking arrangement that comprises a plurality of latches, wherein the plurality of latches is configured to interlock with another plurality of latches of the another taper cover segment.

6. The taper cover segment of claim 4, wherein the locking arrangement comprises the annular snap joint locking arrangement that comprises a male connector having a plurality of bumps that is configured to mate with a female connector of the another taper cover segment, the female connector having a plurality of grooves.

7. The taper cover segment of claim 4, wherein the locking arrangement comprises the bayonet lock arrangement that comprises a male connector having one or more radial pins that is configured to mate with a female connector of the another taper cover segment, the female connector having a matching L-shaped slot.

8. The taper cover segment of claim 1, further comprising:

a second locking arrangement that is monolithic with a second end of the main body; and an end cap that comprises an end cap locking arrangement, wherein the end cap is attached to the main body via the end cap locking arrangement and the second locking arrangement.

9. The taper cover segment of claim 1, wherein each rib is integrated with a curved joint section that joins each rib with the inner surface of the taper cover segment, for reducing stress concentration between the rib and the main body.

10. The taper cover segment of claim 1, wherein the taper cover segment comprises a polymer.

11. The taper cover segment of claim 1, wherein radius of the main body of the taper cover segment depends on an outer radius of the straight roller and a desired taper rate.

12. The taper cover segment of claim 1, wherein the locking arrangement between the taper cover segment and the another taper cover segment prevents movement of the taper cover segment relative to the another taper cover segment.

13. A method comprising:

providing a grip between a rib of a plurality of ribs that are monolithic with a main body and extend radially inward from an inner surface of the main body, and a straight roller, and wherein a plurality of cavities are defined between adjacent ribs of the plurality of ribs; and connecting, via a locking arrangement monolithic with a first end of the main body, a taper cover segment with another taper cover segment to form a taper cover for encasing the straight roller, wherein the taper cover segment defines a longitudinal axis, and wherein a center of mass of the taper cover segment is offset from the longitudinal axis.

14. The method of claim 13, wherein the main body having an outer surface, and the outer surface defining a frustum shape.

15. The method of claim 13 further comprising a weight positioned within one of the plurality of cavities for adjusting the center of mass of the taper cover segment to be offset from the longitudinal axis.

16. The method of claim 13, wherein each of the plurality of ribs define a thickness, wherein the thickness of one of the plurality of ribs is greater than the thickness of another one of the plurality of ribs by at least two hundred percent.

17. The method of claim 13, wherein the locking arrangement comprises at least one of a latch locking arrangement, an annular snap joint locking arrangement, a bayonet lock arrangement, or a thread locking arrangement.

18. The method of claim 17, wherein the locking arrangement comprises the latch locking arrangement that comprises a plurality of latches, wherein the plurality of latches are configured to interlock with another plurality of latches of the another taper cover segment.

19. The method of claim 17, wherein the locking arrangement comprises the annular snap joint locking arrangement that comprises a male connector having a plurality of bumps that is configured to mate with a female connector of the another taper cover segment, the female connector having a plurality of grooves.

20. The method of claim 17, wherein the locking arrangement comprises the bayonet lock arrangement that comprises a male connector having one or more radial pins that is configured to mate with a female connector of the another taper cover segment, the female connector having a matching L-shaped slot.

* * * * *